United States Patent [19]

Wren

[11] Patent Number: 4,601,362

[45] Date of Patent: Jul. 22, 1986

[54] DEVICE FOR DAMPING AN OSCILLATORY SYSTEM

[75] Inventor: John P. Wren, Chiseldon, England

[73] Assignee: Garrard Products Limited, Hamilton, Bermuda

[21] Appl. No.: 608,210

[22] Filed: May 8, 1984

[30] Foreign Application Priority Data

May 19, 1983 [GB] United Kingdom ............... 8313864

[51] Int. Cl.$^4$ .............................................. F16F 15/00
[52] U.S. Cl. ...................... 181/208; 248/580; 248/621
[58] Field of Search ............... 181/207, 208; 188/380; 248/580, 621

[56] References Cited

U.S. PATENT DOCUMENTS

| 989,958 | 4/1911 | Frahm | 188/380 |
| 2,611,063 | 9/1952 | Carpenter | 188/380 X |
| 3,668,939 | 6/1972 | Schrader | 188/380 X |

FOREIGN PATENT DOCUMENTS

| WO82/04091 | 11/1982 | PCT Int'l Appl. |
| 782933 | 9/1957 | United Kingdom . |
| 802579 | 10/1958 | United Kingdom . |
| 1023634 | 3/1966 | United Kingdom . |
| 1024677 | 3/1966 | United Kingdom . |
| 1413149 | 11/1975 | United Kingdom . |
| 1418184 | 12/1975 | United Kingdom . |
| 1420957 | 1/1976 | United Kingdom . |

Primary Examiner—Benjamin R. Fuller
Attorney, Agent, or Firm—Berman, Aisenberg & Platt

[57] ABSTRACT

A device for damping an oscillatory system is described. The device comprises a first connection member connectable to part of a spring and a second connection member connectable to a surface on which the spring is mounted. One end of a first bearing member is rotatably mounted in the first connection member and the other end is fixed in a mounting block. One end of a second bearing member is rotatably mounted in the block to extend perpendicularly of the first bearing member. The other end of the second bearing member is fixed in part of a planar component which is pivotally connected by a flexible joint to a second planar component. The device is symmetrical about the pivot line so that a third bearing member and a fourth bearing member corresponding to the second and first bearing member, respectively, are provided between the second planar component and the second connection member.

9 Claims, 3 Drawing Figures

DEVICE FOR DAMPING AN OSCILLATORY SYSTEM

BACKGROUND OF THE INVENTION

This invention relates to a device for damping an oscillatory system.

Oscillatory systems are used, for example, in mechanical vibration isolation systems for audio reproducing equipment. Typically, such mechanical vibration isolation systems comprise a plurality of mounting springs which in conjunction with the mass of the equipment produce an oscillatory system having a natural frequency which is typically below 12 Hz. In order to provide some stability in the mounting, it is usual to provide some means for damping oscillation, for example a piece of plastics foam.

There are, however, a number of disadvantages associated with such damping devices. Thus, the damping device will normally reduce the degree of vibration isolation attained and will also reduce, to some extent, the effective frequency bandwidth of the isolation system. Also, there are increasing practical difficulties in designing the damping devices when the natural frequency of the oscillatory system is reduced in order to reduce coupling with other oscillatory parts of the equipment and to increase the low frequency isolation. Moreover, it is difficult to control the degree of damping in three planes of oscillation.

OBJECT OF THE INVENTION

It is an object of the invention to overcome or at least mitigate the disadvantages of the previous above described damping devices.

SUMMARY OF THE INVENTION

According to the present invention, there is provided a device for damping vibrations of an oscillatory system, comprising a first connection member connectable to part of an oscillatory system, a second connection member connectable to a surface on which the oscillatory system is mounted, a plurality of bearing members connected between the first connection member and the second connection member, the bearing members being arranged to be responsive to vibrations in a plurality of planes which are not parallel to one another.

The phrase 'bearing member' is used herein to mean a member which is movable in response to a force, for example a vibration, against a resistance, for example a fluid.

In a preferred embodiment, the plurality of bearing comprises a first set of bearing members having a first and a second bearing member responsive to vibrations in a plurality of planes not parallel to one another and a second set of bearing members having a third and a fourth bearing member responsive to vibrations in a plurality of planes not parallel to one another, the first set of bearing members being connected to the second set of bearing members by a joining member. Generally, the first and second sets of bearing members are connected by a flexible member which may comprise first and second components connected by a flexible joint. Alternatively, the first and second sets of bearing members are connected by a fifth bearing member.

Generally, the or each bearing member is movable against the resistance of a fluid.

In a preferred arrangement, each bearing member is rotatable in a respective mounting against the resistance of a fluid and the viscosity of the mounting fluid may be varied between mountings so that, in use, the degree of damping in different directions is selectively varied.

Thus, the present invention enables the provision of a damping device capable of damping vibrations in three mutually perpendicular planes.

The present invention also provides an oscillatory system having a damping device in accordance with the first or second aspect of the invention and audio reproduction equipment having mechanical vibration isolation in the form of one or more oscillatory systems, the or each oscillatory system incorporating a damping device in accordance with the first or second aspect.

BRIEF DESCRIPTION OF THE DRAWINGS

For a better understanding of the present invention, and to show how the same may be put into effect, reference will now be made, by way of example, to the accompanying drawings, in which.

DESCRIPTION OF THE PREFERRED EMBODIMENT

Figure 1:
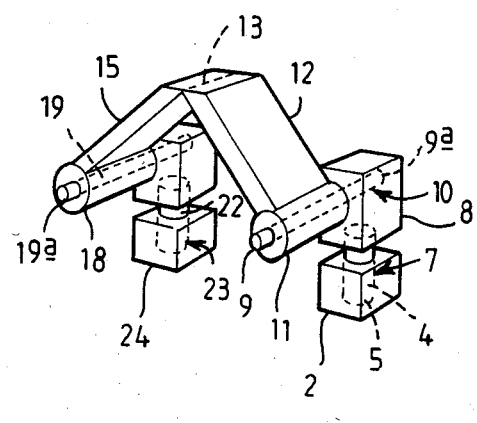
FIG. 1 is a schematic perspective view of a device embodying the invention for damping an oscillatory system.
Figure 2:
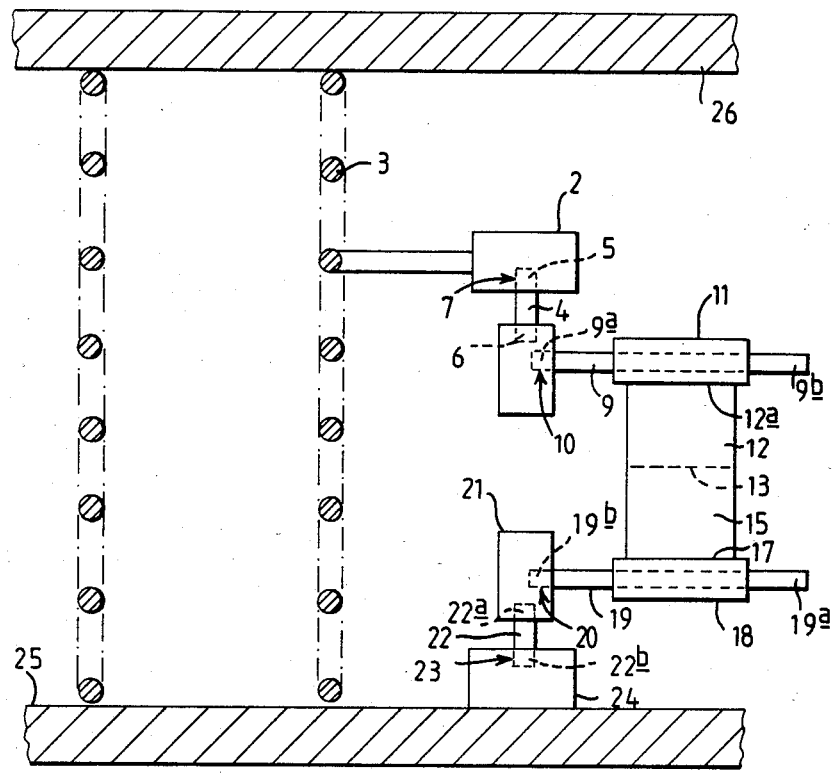
FIG. 2 is a schematic cross-sectional view of part of audio reproducing equipment showing the device of FIG. 1 in use to damp oscillations of a spring.

Referring now to the drawings, a device 1 for damping vibrations of an oscillatory system comprises as shown in FIG. 1, a first connection member 2 connectable, as shown in FIG. 2, to part of an oscillatory system, in the example shown, a spring 3. A first bearing member 4 has one end 5 rotatably mounted in a seat 7 formed in the first connection member 2 and a second end 6 fixed in a mounting block 8. The seat 7 contains a fluid having a given selected viscosity for resisting rotation of the first bearing member 4. One end 9a of a second bearing member 9 is rotatably mounted in a seat 10 in the mounting block 8 so as to extend in a direction perpendicular to the first bearing member. The seat 10 contains a fluid having a given selected viscosity for resisting rotation of the second bearing member. The first and second bearing members are thus rotatable about respective axis which are mutually perpendicular so that the first bearing member is rotatable in response to vibrations in a first plane and the second bearing member is responsive to vibrations in a second plane perpendicular to the first plane. The other end 9b of the second bearing member extends through, and is fixed in, an axial bore formed in a cylindrical member 11. The cylindrical member 11 is fixed to, or formed integrally with, one edge 12a of a planar component 12 so that the axis of the cylindrical member 11 extends parallel to the one edge 12a of the planar component 12.

Figure 3:
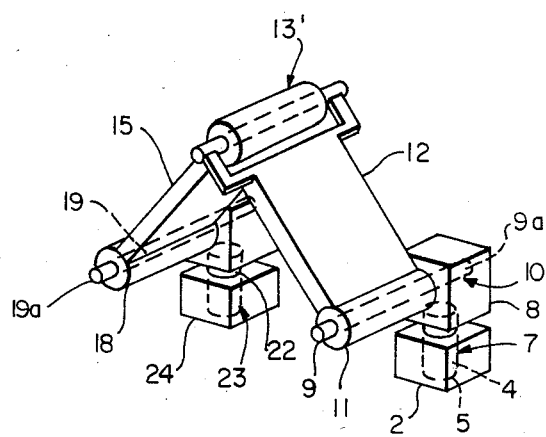
FIG. 3 shows a second embodiment of the device of FIG. 1.

An edge of the planar component 12 parallel to the one edge 12a is connected by means of a flexible joint 13 to an edge of a second similar planar component 15. Of course, the first and second planar components 12 and 15 may be integrally formed, the flexible joint being provided by a weakened region in the integral planar component or third connection member. Alternatively, where the first and second planar components are separate, they may be connected by a fifth bearing 13' (see FIG. 3), similar to the first and second bearings which allows the planar components 12 and 15 to pivot relative to one another about the bearing.

An edge 17 of the second planar component 15 parallel to the one edge thereof is connected, or formed integrally with, a second cylindrical member 18 similar to the cylindrical member 11 so that the axis of the cylindrical member 18 is parallel to the edge 17. A third bearing member 19 similar to the second bearing member 9 has a first end 19a which extends through, and is fixed in, an axial bore formed in the cylindrical member 18. A second end 19b of the third bearing member 19 is rotatably mounted in a seat 20 formed in a mounting block 21. Again, fluid having a selected viscosity is provided in the mounting block 21 to provide a resistance to rotation of the bearing member 19.

One end 22a of a fourth bearing member 22 is fixedly mounted in the mounting bock 21. The other end 22b of the fourth bearing member 22 is rotatably mounted in a seat 23 formed in a second connection member 24 connectable, as shown in FIG. 2, to a support surface 25 on which the spring 3 is mounted. A fluid selected viscosity is provided in the seat 23. The fourth bearing member is arranged to extend in a direction perpendicular to the third bearing member and to be rotatable about an axis extending perpendicularly of the rotation axis of the third bearing member.

As can be seen from FIG. 1, the device is symmetrical about an axis extending along the flexible joint so that the first and fourth bearing member extend parallel to one another and are both responsive to vibrations in the first plane while the second and third bearing members also extend parallel to one another and are responsive to vibrations in the second plane.

The device is thus capable of damping vibrations in three mutually perpendicular planes.

In use of the device, the first connection member 2 is connected to part of the oscillatory system while the second connection member 24 is connected to a surface on which the oscillatory system is supported. In the arrangement shown in FIG. 2, the oscillatory system comprises a spring 3 mounted between equipment 26 to be isolated, such as the turntable of a gramophone, and a support surface 25, such as an internal surface of a casing in which the turntable is disposed. The first connection member 2 is connected, as shown, to part of the spring 3 while the second connection member 24 is connected to the support surface 25. Preferably, the first connection member 2 is connected to the spring so that the device is connected across part, for example two-thirds, of the length of the spring to improve the frequency bandwidth. The damping and the frequency bandwidth may be varied by altering the proportion of the spring spanned by the device.

The device is connected to the spring 3 and the support member 25 so that the first and second planar components 12 and 15 pivot about the flexible joint 13 or further bearing member (not shown) in response to vibrations in a direction parallel to the axis of the spring, that is in response to compression and expansion of the spring.

The first and fourth bearing members 4 and 22 are rotatable in response to vibrations in a first plane perpendicular to the spring axis that is to vibrations in and out and to the left and right in FIG. 2. The second and third bearing members 9 and 19 are responsive to vibrations in a second plane perpendicular to the plane of the paper and containing the spring axis, that is to vibrations in and out of the paper and to compression and expansion of the spring. The flexible joint 13 together with the second and third bearing members are responsive to vibrations in the plane of the paper, for example to compression and expansion of the spring 3.

The damping device which can be applied to almost any compliance (spring)/mass system has a wide natural frequency range and three degrees of freedom enabling the device to damp vibrations in three mutually perpendicular planes. Moreover, by adjusting the viscosity of the bearing fluids, the degree of damping can be controlled. Also, the viscosity of the bearing fluids can be varied from bearing to bearing so that the degree of damping in different directions can be varied.

Although particular embodiments of the Invention have been described and illustrated herein, it is recognised that modifications may readily occur to those skilled in the art and consequently it is intended that the following claims be interpreted to cover such modifications and equivalents.

What is claimed is:

1. A device for damping vibrations of an oscillatory system mounted on a surface, comprising: a first connection member for connection to part of said oscillatory system; a second connection member for connection to said surface on which said oscillatory system is mounted; and a plurality of bearing means connected between said first connection member and said second connection member, said plurality of bearing means comprising a first bearing means having a first and a second bearing members responsive to vibrations in respective planes not parallel to one another and a second bearing means having a third and a fourth bearing elements responsive to vibrations in respective planes not parallel to one another, the first bearing means being connected to the second bearing means by a joining member.

2. A device according to claim 1, wherein said joining member comprises first and second components connected by a flexible joint.

3. A device according to claim 1, wherein said joining member is a fifth bearing member.

4. A device according to claim 1, wherein said first and second bearing members rotate about respective mutually perpendicular axes, said third and fourth bearing members rotate about respective mutually perpendicular axes and the joining member rotates about an axis parallel to one of the axes of the bearing members in each of said bearing means, the arrangement being such that the device is responsive to vibrations in three mutually perpendicular planes.

5. A device according to claim 1, wherein each bearing member is movable against the resistance of a fluid.

6. A device according to claim 5, wherein each bearing member is rotatable in a respective mounting against the resistance of a fluid.

7. A device according to claim 5, wherein the viscosity of the fluid is variable so that, in use, the degree of damping in different directions can be varied.

8. A device for damping vibrations of an oscillatory system mounted on a surface, comprising: a first connection member for connection to part of said oscillatory system; a second connection member for connection to said surface on which said oscillatory system is mounted; a plurality of bearing means connected between said first connection member and said second connection member, said plurality of bearing means comprising a first bearing means having a first bearing member and a second bearing member, said first and second bearing members being rotatable about first and second mutually perpendicular axes; and a second bearing means having a third bearing member and a fourth bearing member, said third and fourth bearing members being rotatable about third and fourth mutually perpendicular axes; a joining member connecting said first and second bearing means, said joining member comprising first and second components connected for rotation about an axis parallel to said second and third axes; wherein each of said bearing means comprises a fluid-containing recess and one of said bearing members mounted in a respective said fluid-containing recess so as to be rotatable therein against the resistance of the fluid whereby the device is responsive to vibrations in three mutually perpendicular planes.

9. Audio reproduction equipment having a mechanical vibration isolation in the form of one or more oscillatory systems, the or each oscillatory system incorporating a damping device, comprising: a first connection member for connection to part of said oscillatory system; a second connection member for connection to a surface on which said oscillatory system is mounted; a plurality of bearing means connected between said first connection member and said second connection member, said plurality of bearing means comprising a first bearing means having a first bearing member and a second bearing member, said first and second bearing members being rotatable about first and second mutually perpendicular axes; and a second bearing means having a third bearing member and a fourth bearing member, said third and fourth bearing members being rotatable about third and fourth mutually perpendicular axes; a joining member connecting said first and second bearing means, said joining member comprising first and second components connected for rotation about an axis parallel to said second and third axes; wherein each of said bearing means comprises a fluid-containing recess and one of said bearing members mounted in a respective fluid-containing recess so as to be rotatable therein against the resistance of the fluid whereby the device is responsive to vibrations in three mutually perpendicular planes.

* * * * *